United States Patent [19]
Genthner

[11] 3,954,547
[45] May 4, 1976

[54] METHOD AND APPARATUS FOR PRODUCING LAMINATED GLASS SHEETS WITH THIN WIRES ARRANGED IN AN THERMOPLASTIC INTERMEDIATE LAYER

[75] Inventor: Werner Genthner, Pforzheim, Germany

[73] Assignee: Saint-Gobain Industries, Neuilly-sur-Seine, France

[22] Filed: Nov. 28, 1972

[21] Appl. No.: 310,064

[30] Foreign Application Priority Data
Nov. 29, 1971 Germany............................ 2159072
Nov. 29, 1971 Germany............................ 2159073
Feb. 3, 1972 Germany............................ 2204939

[52] U.S. Cl................................ 156/436; 29/611; 140/105; 156/177; 156/178; 156/443
[51] Int. Cl.² ........................ B32B 5/08; B21F 1/04
[58] Field of Search ........... 156/177, 178, 435, 436, 156/439, 443, 99, 106; 219/203; 29/611; 140/93 R, 105; 72/DIG. 16

[56] References Cited
UNITED STATES PATENTS

| | | | |
|---|---|---|---|
| 2,831,525 | 4/1958 | Cole.................................... | 156/435 |
| 2,963,048 | 12/1960 | Smith................................... | 140/105 |
| 3,392,759 | 7/1968 | Davy et al........................... | 140/105 |
| 3,523,844 | 8/1970 | Crimmins et al. .................. | 156/436 |
| 3,534,781 | 10/1970 | Powell et al. ....................... | 140/105 |
| 3,723,213 | 3/1973 | Hocy.................................... | 156/435 |
| 3,805,579 | 4/1974 | Calvert ................................ | 140/105 |

*Primary Examiner*—Daniel J. Fritsch
*Attorney, Agent, or Firm*—Pennie & Edmonds

[57] ABSTRACT

In the production of safety glass with a plastic sheet as an intermediate layer, wires such as electrical heating wires, are fixed on the plastic sheet in their final (for instance, undulating) shape in a stressfree condition.

11 Claims, 28 Drawing Figures

U.S. Patent   May 4, 1976   Sheet 1 of 14   3,954,547
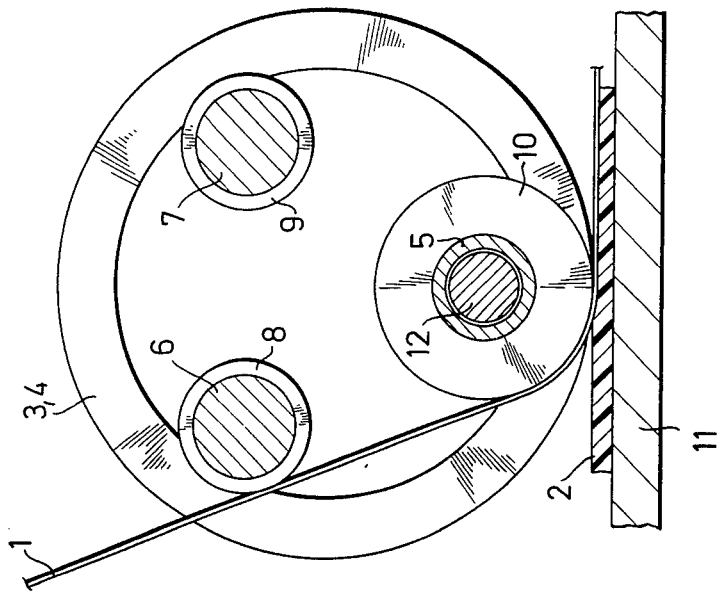
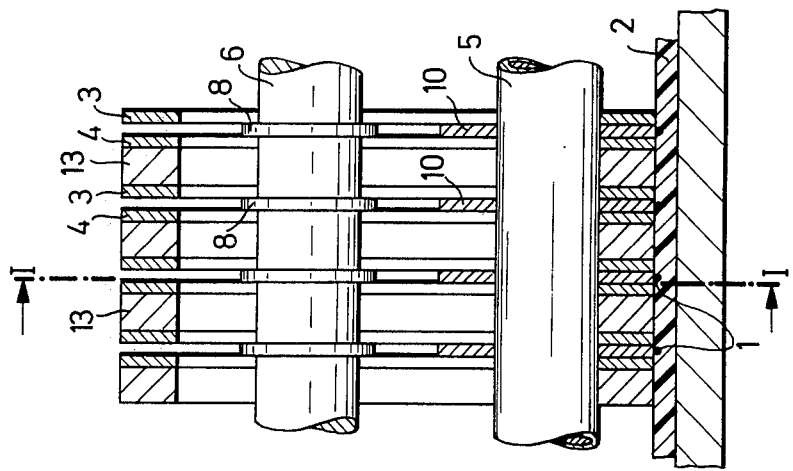

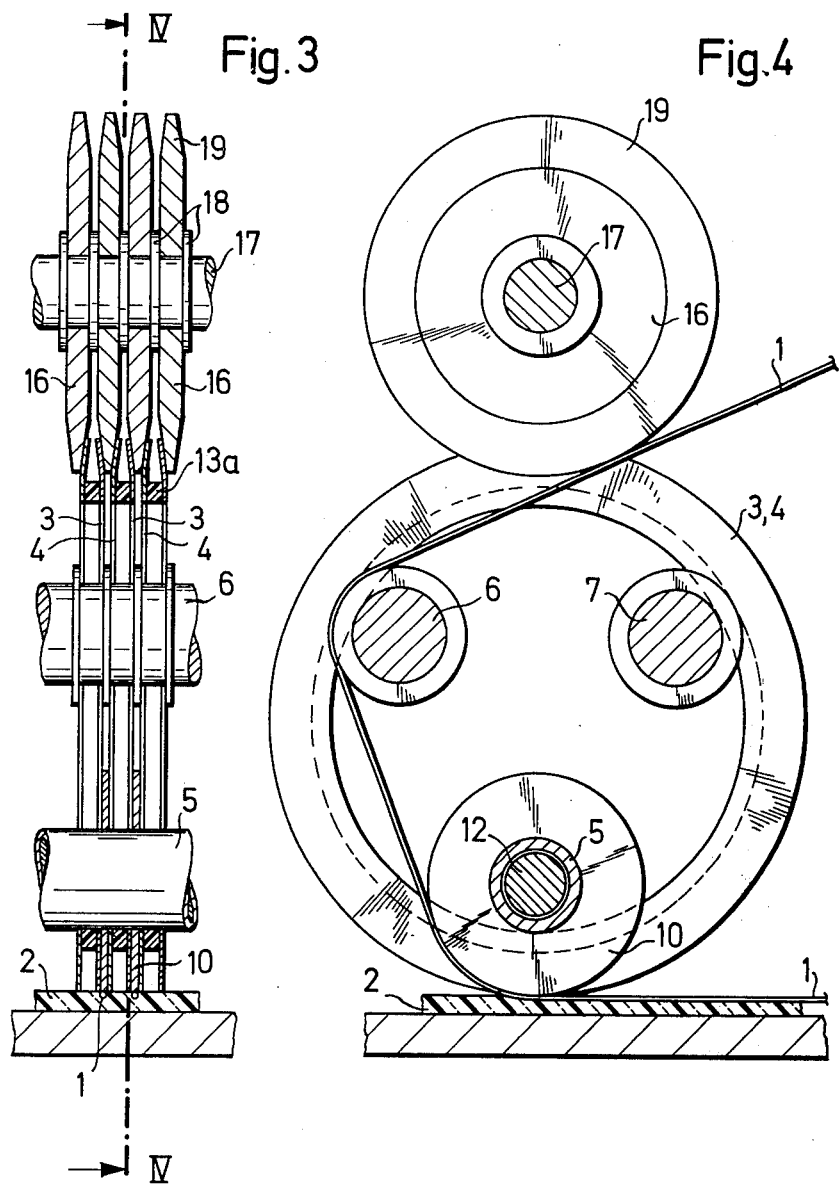

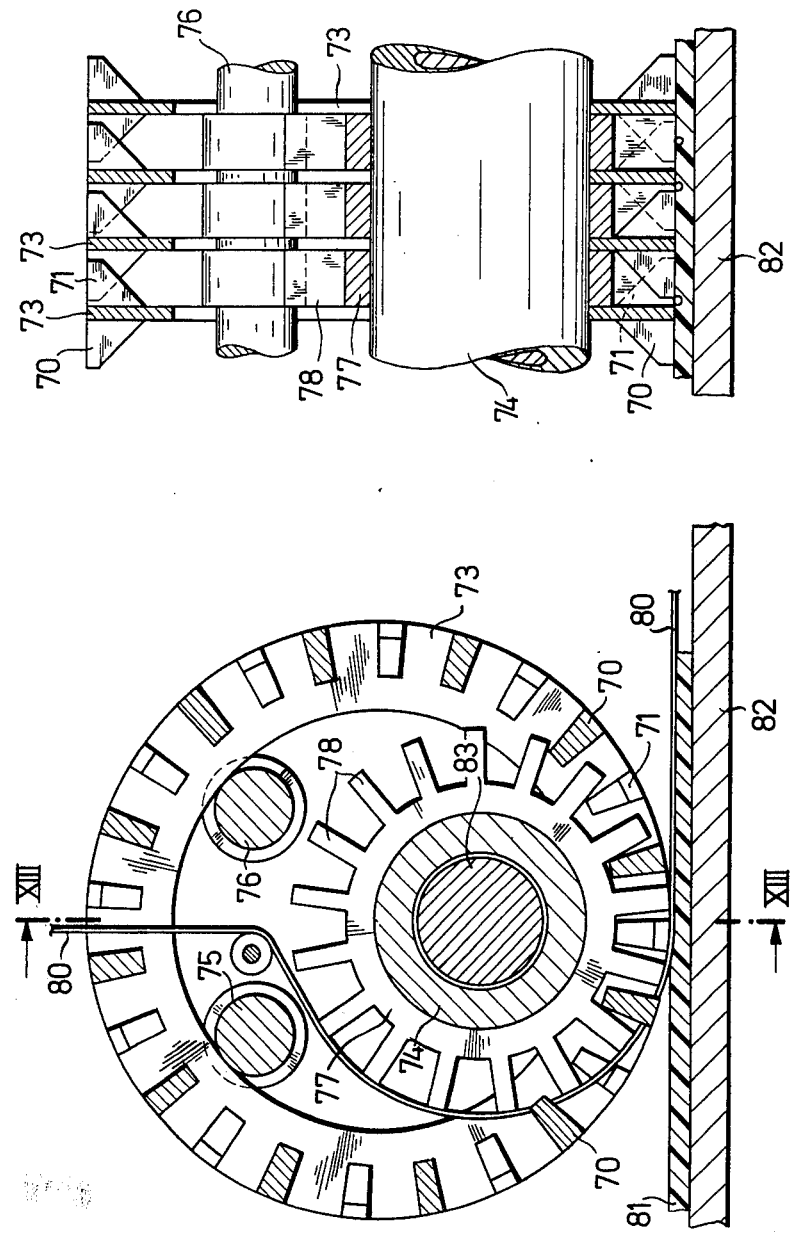

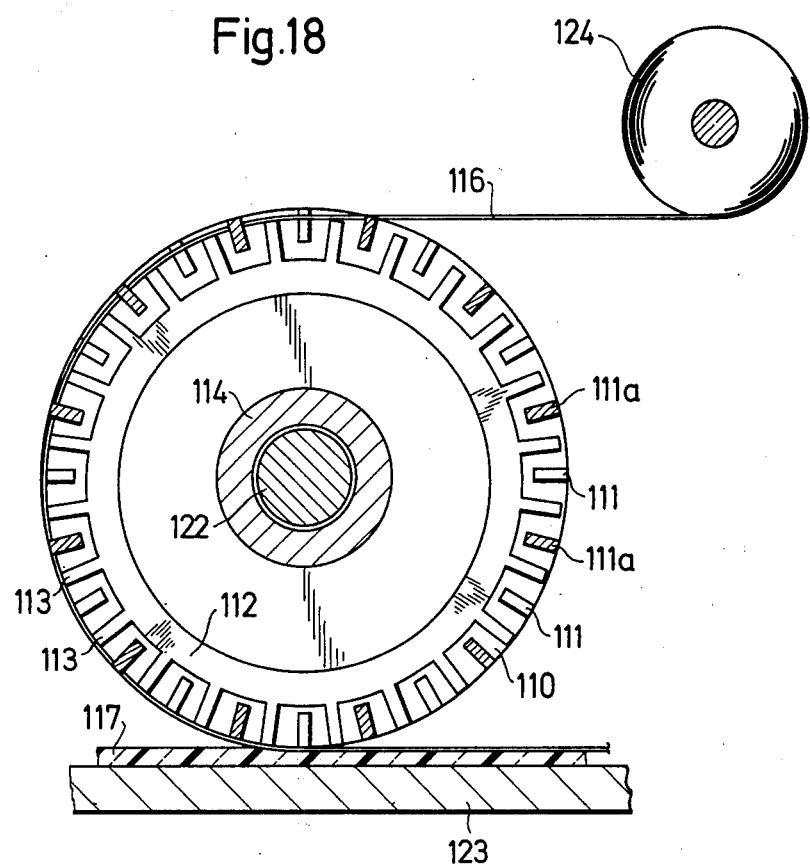

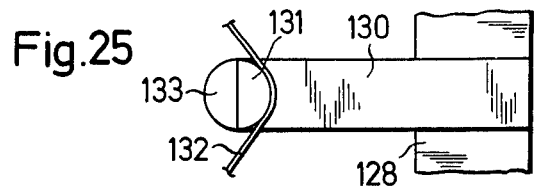
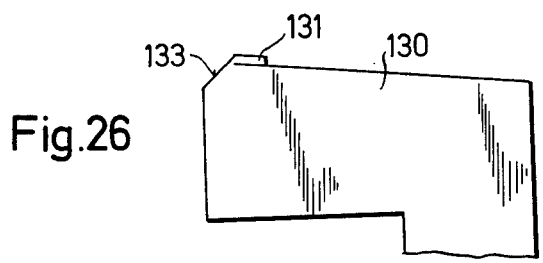
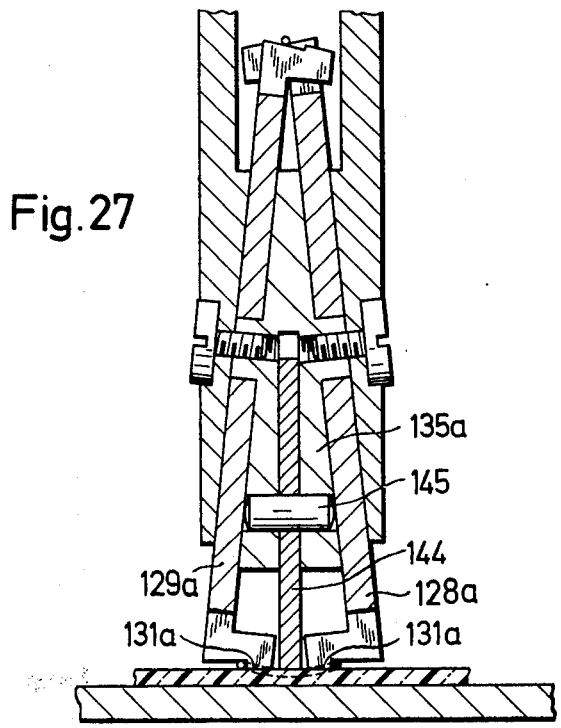

METHOD AND APPARATUS FOR PRODUCING LAMINATED GLASS SHEETS WITH THIN WIRES ARRANGED IN AN THERMOPLASTIC INTERMEDIATE LAYER

BACKGROUND OF INVENTION

1. Field to which invention relates

The invention relates to a method for the production of laminated glass sheets with thin wires arranged in a thermoplastic intermediate layer, and more particularly for the production of electrically heated laminated glass sheets, in the case of which the wire supplied from a supply bobbin is fixed in the desired position on the thermoplastic intermediate layer.

2. The prior art

Various methods have been proposed for the production of laminated glass sheets with parallel wires laid in the thermoplastic intermediate layer. In accordance with one of these known methods an array of parallel wires, supplied by separate bobbins, are drawn simultaneously through a spacing device, drawn out to the desired length and then lowered together onto the sheets (see German Pat. No. 870,475). In accordance with a further previously proposed method the array of parallel wires is formed by winding a wire on a frame. The wire is fixed on the frame on two supports extending in a direction which is transverse in relation to the direction of the wire coils. Following this the wire coils are severed and the wire array formed is placed with the help of the supports on the sheet (see Swiss Pat. No. 440,574).

These known methods are therefore only suitable for the production of laminated glass sheets with parallel straight wires. They are not suitable for the production of sheets in which the wires are not straight but have, for example a regular undulating shape. Furthermore, in the case of the simultaneous application of a number of wires there is the danger that all wires may not be tensioned equally so that an absolutely straight arrangement of all wires is not ensured. Finally, these previously proposed methods have the disadvantage that they require a comparatively large amount of manual work.

Furthermore, another method of the type mentioned has been previously proposed in which the wire is supplied from a depositing device, constructed in the form of a sliding shoe, and is pressed into the foil (see German Pat. No. 876,874). This method is primarily used for the production of sheets with an undulating shape of the wires and in this case the depositing device is caused to perform periodical transverse movements over the foil. Instead of a single depositing device it is also possible to provide several adjacently placed depositing devices so that several wires can be fixed simultaneously on the foil.

In the case of the deposit of the wire in an undulating shape the undulating shape is directly produced on the foil surface. Since the wire is diverted again and again and at the same time is subject to a certain tension, a satisfactory arrangement or deposit of the wire is only ensured when the wire is sufficiently fixed as it is laid or deposited on the foil. If this is not done, it will be detached from the foil surface again owing to the tension, necessarily present, in the wire. The degree of fixation required can, however, only be ensured when the laying of the wire on the foil is carried out with a moderate speed. Owing to this rigid limits are set as regards increasing the speed of laying.

SUMMARY OF INVENTION

One aim of the invention is to provide a method for the production of laminated glass sheets with wires, deposited on the thermoplastic intermediate layer, which is suitable in principle both for the deposit of wires in a straight form and also for the deposit of wires in an undulating form and in the case of which the speed of laying the wire on the support layer can be substantially increased as compared with known methods and consequently operates more economically.

In order to achieve this aim as broadly defined there is the basic provision in accordance with the invention that each individual wire is brought into its final shape or form immediately before application on the support layer and in this shape the wire is applied to the foil in a unstressed condition.

Since in the case of the method of the invention after the application of the wire no further stresses exist in the wire, substantially less adhesion of the wire on the foil surface is needed to apply the wire in the desired shape in a permanent manner. Consequently the speed of laying or application can be substantially increased. While for example in the case of known methods for the laying of an undulating wire with a wave length of 3 mm and an amplitude of 1.5 mm on a foil of polyvinylbutyral 23 seconds were required, in the case of the novel method using a device which will be described in detail below, only 5 seconds or less are required for laying the wire section in the same shape.

In accordance with a convenient development of the new method the fixation of the wire on the foil is achieved by plasticising the foil by the action of heat and the wire is pressed into the plasticised foil. For example, the tools which deform the wire and press it into the foil can be heated and the plasticisation of the foil can occur on making contact with the heated tools. In accordance with another embodiment of the invention the wire is fixed on the foil by plasticising the foil before the application of the wire by the application of heat and the wire is pressed in with tools which are not heated.

In accordance with another embodiment it is also possible to plasticise the foil by the application of a solvent which begins to dissolve the foil. Alternatively, for fixing the wire on the foil it is possible to apply an adhesive with the wire simultaneoudly on the foil.

The method in accordance with the invention is particularly suitable for the production of laminated glass sheets with wires arranged in the shape of a zig-zag line, an undulating or a sinusoidal line.

The invention furthermore relates to various forms of apparatus for carrying out the new method.

A first group of forms of apparatus, which are suitable for the application or deposit of straight wires, is characterised in that above a support serving as an abutment for the foil, there is provided for each wire a pair of guide wheels or guide rings which laterally guide the wire. These wheels, are arranged parallel to each other, run on the foil, and between them a pressing wheel of a smaller diameter is so eccentrically arranged that its periphery lies at that position at which the guide wheels or guide rings make contact with the foil at the same level as the periphery of the guide wheels and so pushes out the wire from the gap between the guide wheels.

For the application or deposit of the zig-zag or undulating wires various novel forms of apparatus are proposed. A first group of forms of apparatus suitable for this purpose is characterised in that above a support, serving as an abutment for the foil, for each wire a pair of guide members is arranged, which guide the wire laterally, bring it into the desired shape and comprise rigid deforming wedges which are arranged opposite to each other, fit into each other and run obliquely upwards. Between these deforming wedges there are provided pressing fingers which move vertically, by means of which the wire is pressed over the obliquely converging surfaces of the deforming wedges with the formation of the desired shape in a downward direction and is pressed into the foil. The guide members carrying the deforming wedges can in this case be mounted on rails arranged parallel to each other in the form of a grid. They can, however, in accordance with an advantageous feature of the invention, also be arranged at the periphery of parallel guide wheels or guide rings which run on the foil. The pressing fingers are preferably constructed as radial projections on the periphery of a pressing wheel.

A further group of forms of apparatus for the deposit or application of the wire in an undulating form is characterised in that guide wheels or guide rings, which also run on the foil, are provided with deforming wedges on their peripheries. These deforming wedges are however formed by elastic bending of teeth on the peripheral zones of the guide wheels or guide rings, which are made of elastically deformable material. Between the guide wheels or guide rings there is, again, a pressing wheel provided with pressing fingers, and this wheel in the lower part of the guide rings fits between the peripheral segments which are bent upwards towards the deforming wedges, and at least in the engagement zone of the pressing fingers a spreading device is provided by means of which the peripheral segments can be bent upwards elastically to the deforming wedges.

A further group of forms of apparatus for the deposit of undulating wires comprises two guide wheels or guide rings with oppositely placed interengaging teeth, and the guide rings are arranged at such an angle obliquely in relation to each other that in the zone of contact with the foil the teeth mesh and in the opposite zone are so far removed from each other that the wire runs between the teeth, and in the plane of symmetry between the guide wheels and guide rings a pressing wheel, provided with pressing fingers, is arranged, which holds the wire between the teeth, and presses it out of the zone between the teeth into the foil.

Finally, a further group of forms of apparatus for deposit or application of undulating wires is characterised in that for each wire a pair of guide wheels or rings with meshing teeth is provided, and on their peripheral surfaces the teeth are provided with short, ourwardly directed radial projections, which fed behind the wire and the guide wheels or rings are set obliquely at such an angle to each other that in the zone, in which the wire is supplied, the teeth fit over each other and the wire is laid between the radial projections, while at the point at which the wire is applied to the foil the teeth are moved apart and the wire is drawn by them into the desired undulating shape. In the case of this group of forms of apparatus the guide wheels or rings can themselves press the wire into the foil. It is, however, also possible to provide as an addition a circular pressing wheel between the guide wheels or rings.

LIST OF SEVERAL VIEWS OF DRAWINGS

Embodiments of all groups of forms of apparatus are now described with reference to the accompanying drawings.

FIGS. 1 to 4 show two embodiments of an apparatus for applying a straight wire in section and elevation respectively.

FIGS. 12 to 15 show embodiments of a wire applying device with rotating parallel guide rings with rigid deforming wedges arranged at the periphery and, between them, a pressing wheel.

FIGS. 18 to 21 show in various views and in section an embodiment of an apparatus with guide rails which are arranged obliquely in relation to each other so as to diverge upwardly.

FIGS. 22 to 27 show various views of two embodiments of an apparatus for applying undulating wire with obliquely converging guide rails which at the point of application lie apart.

DESCRIPTION OF PREFERRED EMBODIMENTS

Figure 5:
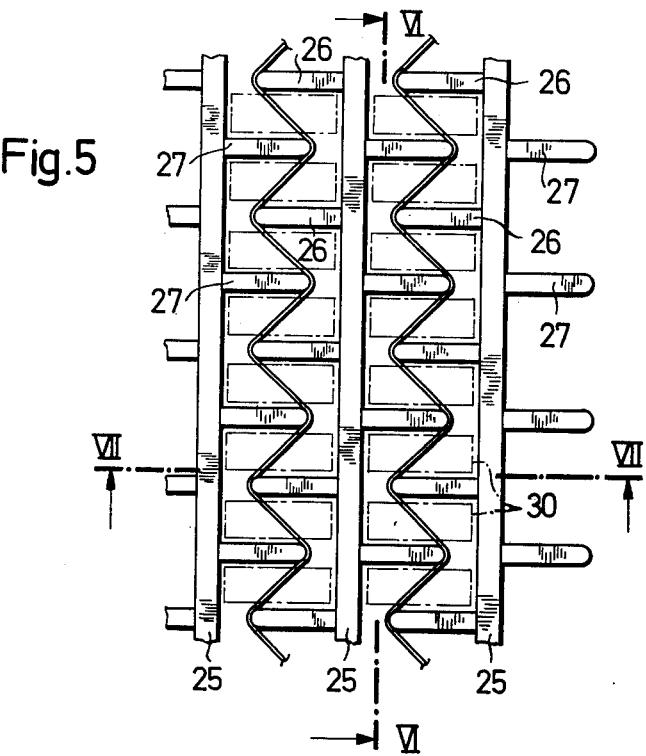
FIGS. 5 to 7 show diagrammatically in plan view and in two sections an embodiment of an applying device in the form of a frame.

In the case of the apparatus shown in FIGS. 1 and 2 it is a question of an arrangement with which the wire 1 is fixed in a straight shape on the thermoplastic foil 2. The applying or laying device for a wire comprises two circular guide rings 3, 4, which are journalled on three rollers 5, 6, and 7. The guide rings 3, 4 are arranged with a small gap between them as determined by the spacing washers 8, 9 arranged on the rollers 6, 7 and by the pressing wheel 10 arranged on the roller 5. The pressing wheel 10 is thus eccentrically journalled in relation to the guide rings and has such a diameter that at the point of contact with the foil 2 it lies at the same level as the guide rings 3, 4 or extends slightly beyond the guide rings 3, 4. The foil 2 lies on a suitable table 11, while the wire applying device runs over the foil. The wire 1 is drawn from a bobbin, not shown, and runs between the guide rings 3, 4 below the pressing wheel 10 and the latter presses it out of a position adjacent to the guide rings and applies it on the surface of the foil 2. Inside the roller 5 an electric heating resistor or heating element 12 is arranged. By means of this heating resistor 12 the pressing wheel 10 is heated to a temperature which is sufficient to plasticise the thermoplastic foil 2 to such an extent that the wire 1 is fixed on the foil surface.

As can be seen from FIG. 1 preferably several of the arrangements described are arranged adjacently on the rollers 5, 6, and 7 and their mutual spacing is determined by spacing rings 13. In this manner as many wires as desired can be applied to or deposited on the foil adjacent to each other with a spacing determined by the spacing rings 13.

If the wires to be applied are extremely thin, as is the case of electrically heated sheets, in the case of which wires with a diameter in the order of magnitude of 1/100 mm are used, it may be advisable to adopt additional measures for introducing the wires into the laying or applying apparatus. A possible embodiment in this respect is shown in FIGS. 3 and 4. The apparatus corresponds with the arrangement previously described as regards the wire depositing or applying part; it is only that the spacing rings 13a differ from the spacing rings 13 in that they have a diameter smaller than that of the guide rings 3, 4 so that the peripheral parts of the guide rings 3, 4 can be bent outwards. Above the guide rings 3, 4 each wire guiding gap is provided with a spreading wheel 16 between two respective guide rings, the wheel 16 being journalled on the shaft 17. Reference numerals 18 denote spacing washers, which serve for providing the required spacing between the individual spreading wheels 16. The peripheral zone 19 of the spreading wheels 16 tapers conically and fits in the wire guiding gap between the guide rings 3, 4 and bends the latter in an outward direction to such an extent that the wire 1 can be securely introduced into the gap broadened in this manner. The guide rings 3, 4 accordingly consist of elastic, thin material, for example of steel spring sheet, which takes part in this deformation at the periphery purely elastically.

Figure 6:
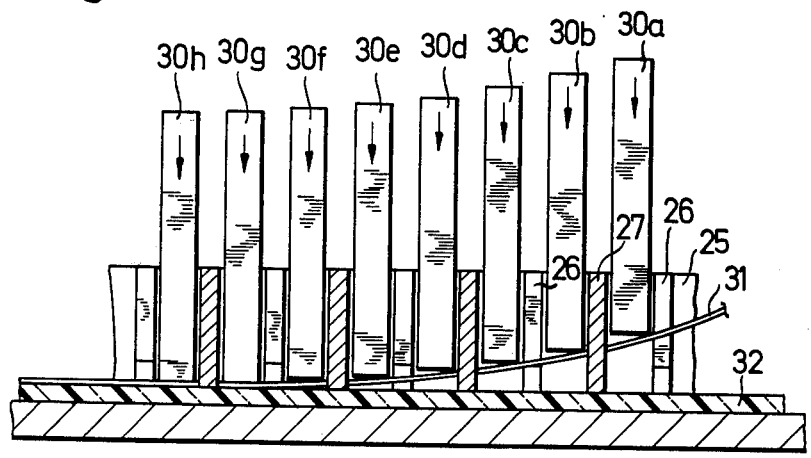
Figure 7:
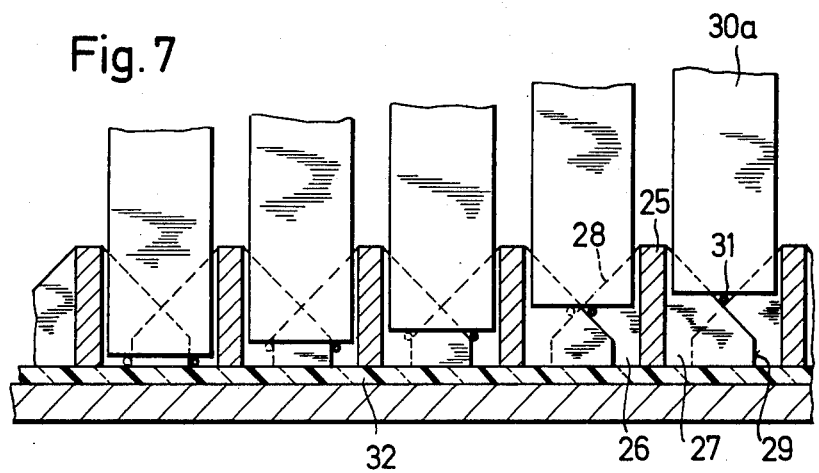

FIGS. 5 to 11 show various embodiments of an apparatus in part views. In the case of this apparatus the formation of the desired shape of the wire and the deposit of the wire of the foil is carried out using a rigid frame. Such a frame consists of a series of parallel rails 25, which have deforming wedges 26, 27 mounted on them. These wedges are directed laterally towards each other. The deforming wedges 26 fit into the gaps between the deforming wedges 27. As shown more particularly in FIG. 7 the wedges 26 have chamfered surfaces 28. All edges of these deforming wedges, more particularly the vertical edges 29, are radiussed. Each deforming wedge 26 is slightly spaced from the ajacent deforming wedges 27 so that the vertically moving pressing fingers 30 can be introduced into the resulting gap. The wire 31 is laid respectively between two rails 25 so that it lies on the oblique faces 28 of the deforming wedges 26, 27. Following this the pressing fingers 30 are lowered sequentially, as shown diagrammatically in FIG. 6, representing a section along the line VI—VI of FIG. 5. The pressing finger 30h has generally reached its end position, while the pressing finger 30a has just come into contact with the wire 31. The pressing fingers 30b to 30g assume intermediate positions. As shown also more particularly in FIG. 7, which represents the section along the line VII—VII, the wires 31 are pressed in this manner over the oblique faces 28 in a downward direction so that before application to the foil 32 they assume the distances in spacings of the deforming wedges 26, 27 corresponding to an undulating shape. The pressing fingers 30 are moved downwards some distance further until they have pressed the wire 31 into the thermoplastic foil 32. Preferably the pressing fingers 30 are heated to such a temperature that as a result the thermoplastic foil 32 is sufficiently plasticised in order to fix the wire 31.

Figure 8:
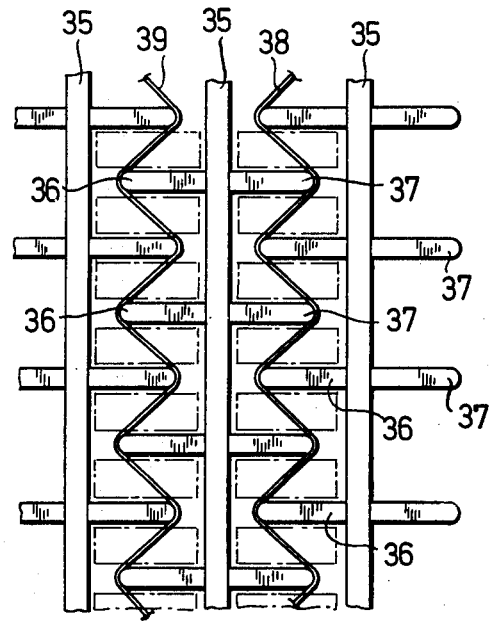
FIGS. 8 to 10 show in plan various embodiments of applying frames for different shapes of wires.

While in the case of the pressing frame shown in FIG. 5 the deforming wedges 26, 27 are so arranged that the waves in the wire produced as a result have the same phase position, in accordance with the same principle it is possible to achieve any desired phase displacements between adjacent wire waves. FIG. 8 shows by way of example one embodiment in the case of which the deforming wedges 36, 37 arranged on the rails 35 on both sides, lie at the same level. In this manner adjacent wire waves 38, 39 are produced with a phase displacement or shift of 180°.

Figure 9:
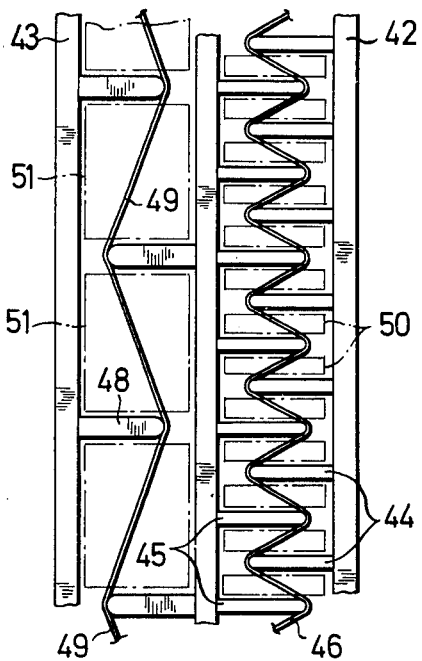
Figure 10:
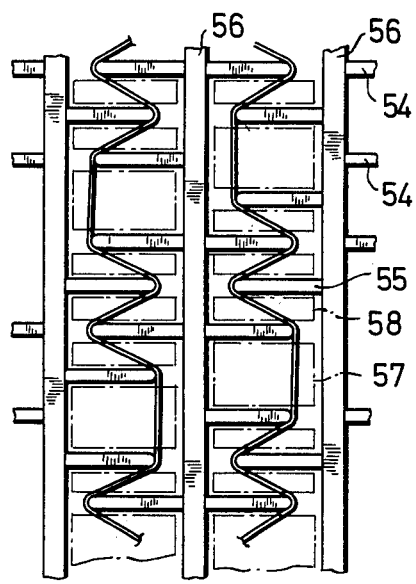
Figure 11:
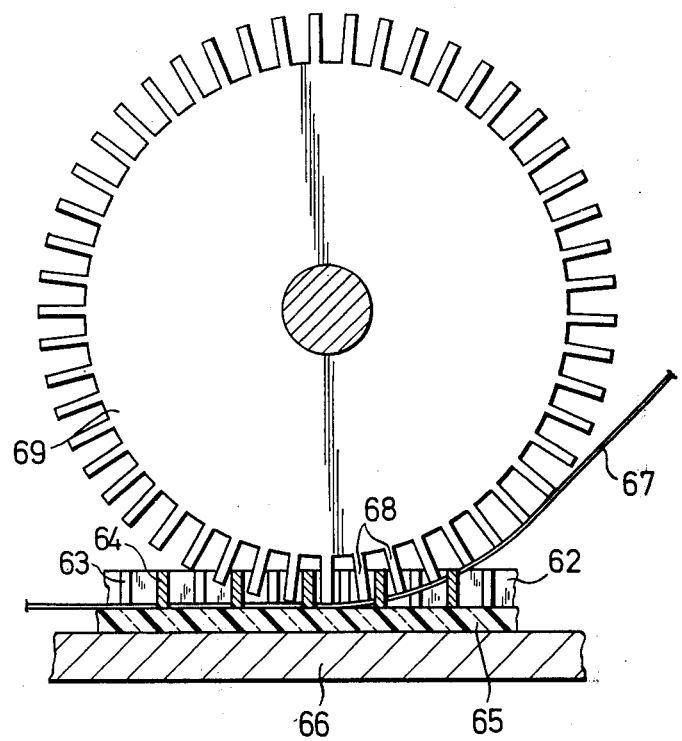
FIG. 11 shows in diagrammatic side view the construction of a pressing device, in the form of a pressing wheel, which can be used for an applying frame.

It is also possible to change or vary the shape of the wire waves within wide limits. Examples for this are shown in FIGS. 9 and 10. It can be seen from FIG. 9 how by means of changing the distance between the deforming wedges the length of a wire wave can be varied. While the deforming wedges 44, 45 arranged on the rails 42, 43 and directed towards each other, have a small spacing between them, and thus the wire 46 has a shape with a small wave length, the deforming wedges 47, 48 on the central rails and on the rails 43 and directed towards each other have a comparatively large spacing between them.

Consequently the wave length in the case of the wire 49 is substantially greater. The dimensions of the pressing fingers 50, 51 are naturally determined in accordance with the distance between the deforming wedges.

The amplitude of the wave shape can be influenced by changing the depth of penetration of the deforming wedges which are directed towards each other. The wave shapes can even be varied to such an extent to form straight lines, when the deforming wedges are not inserted into each other and instead terminate at a distance determined by the wire thickness.

Finally, FIG. 10 shows an embodiment in the case of which by a suitable arrangement of the deforming wedges 54, 55 at the rails 56 wire waves with a non-symmetrical wave shape are produced. The pressing fingers 57, 58 differ as regards their dimensions and are selected in order to suit the available intermediate space between the deforming wedges.

FIG. 11 again shows a frame consisting of rails 62 and deforming wedges 63, 64 fixed on it. The frame is laid on a foil 65 which lies on a table 66. The pressing fingers 68 serving for applying the wire 67 to the foil 65 are arranged at the periphery of a roller 69 as radial projections. In the case of this particularly convenient form of the invention the roller 69 therefore only needs to be rolled or run between the rails 62.

The principle of bringing the wire into the desired shape with the help of deforming wedges and pressing fingers and applying it to the foil can also be put into practice using rotating parts. In the case of the embodiment shown in FIGS. 12 to 15 the deforming wedges 70, 71 are arranged at the peripheries of circular rings 73 in such a manner that they are again directed towards each other and fit into each other. The rings 73 are journalled on the shafts 74, 75, and 76. Between the rings 73 pressing wheels 77 are arranged which over their whole peripheries have radially extending pressing fingers 78 which fit into the intermediate space between the following deforming wedges 70, 71. Owing to their diameter which in comparison with the diameter of the rings 73 is small, and owing to their eccentric journalling on the shaft 74 the pressing fingers 78 only extend into the lower zone adjacent to the rings 73 between the deforming wedges. In this manner the wire is pressed from the inside over the deforming wedges 70, 71 in an outward direction and so pressed into the foil 81, which is again arranged on a support or abutment 82. The shaft 74 is hollow and in its cavity an electrical heating rod 83 is arranged which serves to heat the pressing wheels 77 with the pressing fingers 78.

Figure 14:
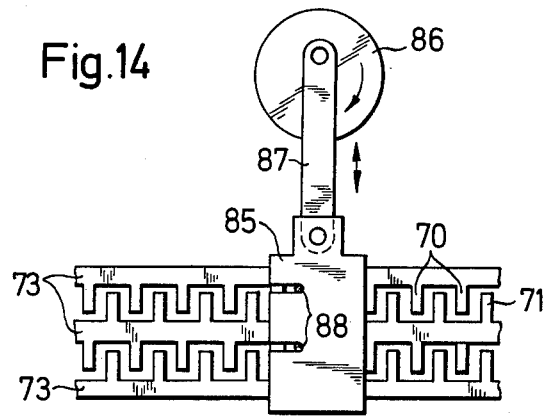
Figure 15:
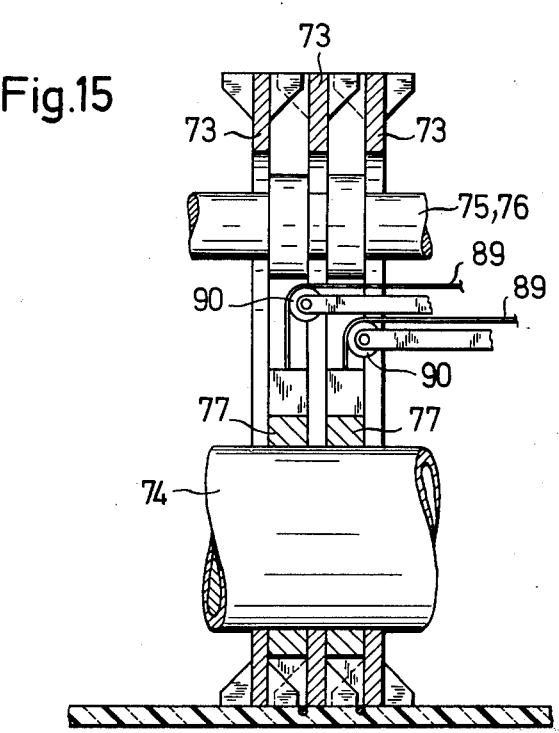

Before the wire 80 is pushed outwards over the deforming wedges 70, 71, it must firstly be introduced into the interior space of the rings 73. This can be carried out for example by means of an oscillating slotted member 85, as shown in FIG. 14. This oscillating slotted member 85 is arranged above the rings 73 and is caused to move by a drive motor 86 and a pushing rod 87 in an oscillating manner. In the guide slots 88 the wire is guided and so introduced into the undulating slot between the deforming wedges 70, 71. Another possible construction, shown diagrammatically in FIG. 15, involves introducing the wires 89 through the free space between the inner limit of the rings 73, the pressing wheel 77 and the shafts 75, 76 from the side in an axial direction, and diverting it between the rings 73 in the respective radial direction, via small rollers 90, which are mounted on a rod running parallel to the shafts 75, 76.

Figure 17:
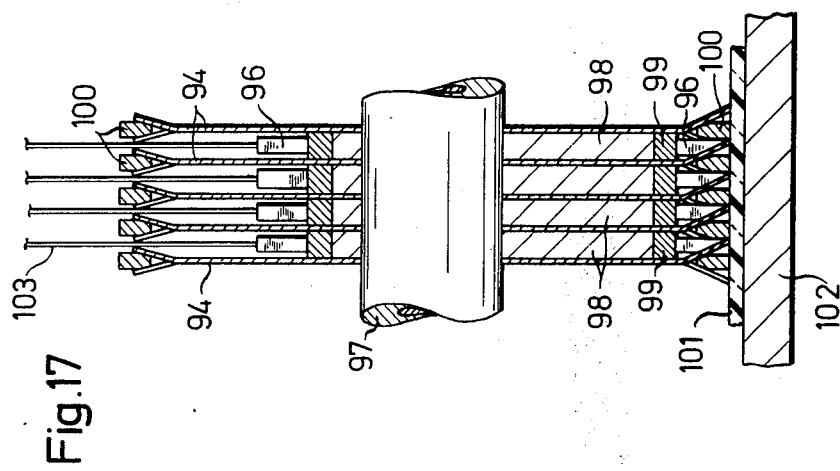
FIGS. 16 and 17 show respectively in side view and in section a further embodiment of a wire applying device with parallel guide rings of elastic material, which are bent up at the periphery to form deforming wedges.
Figure 16:
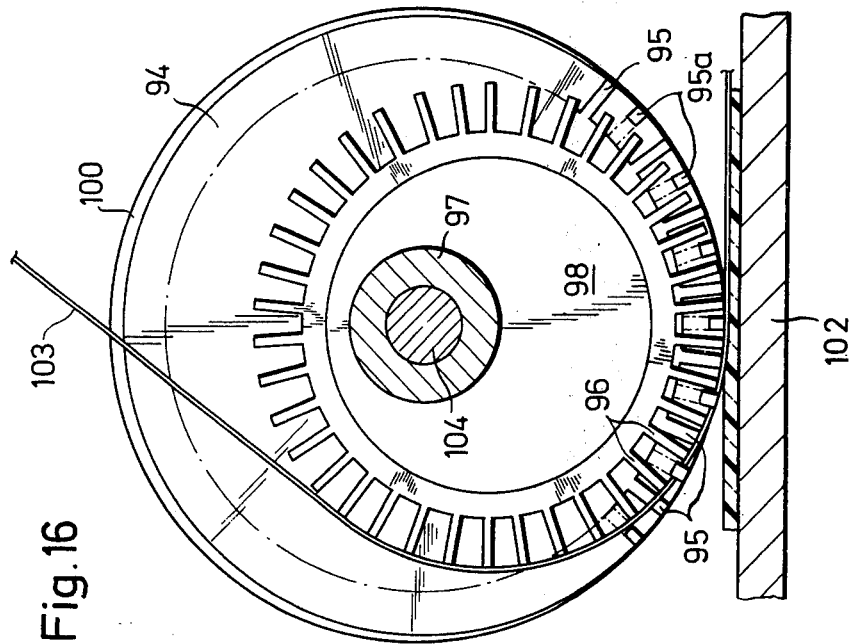

FIGS. 16 and 17 show another embodiment of an applying apparatus, in the case of which the deforming wedges for the wire are provided at the periphery of guide rings. The guide rings 94 consist in this case of thin discs or washers of elastic material, for example spring steel. Over their whole periphery the guide rings are provided with radial projections 95. The radial projections 95 on one guide ring have such a spacing between them that in the intermediate space between two adjacently placed projections of one guide ring a projection 95a of the adjacent guide ring can fit and between these projections a respective pressing finger 96 can fit. The guide rings 94 are journalled on a continuous shaft 97. On this shaft 97 between the individual guide rings 94 eccentrically arranged washers or discs 98 are arranged, which serve as bearings for the pressing rings 99 providing with the pressing fingers 96.

The radial projections 95 of each guide ring 94 are displaced by means of a spreading ring 100 alternately in the two lateral directions, as can be seen in FIG. 17. The spreading ring 100 has a greater external diameter than the guide ring 94 and at its inner periphery is constructed so as to be wedge-shaped in section. As the arrangement runs over the foil 101, which is arranged on the rigid support 102, the spreading rings are so far pressed between the radial projections 95 that the pressing fingers 96 touch the foil 101. As a result the radial projections 95 are spread out continuously to such an extent that they fit between each other to the desired extent and thus move the wire 103 into the desired undulating shape. Simultaneously the wire 103 is pushed by the rotating pressing fingers 96 gradually over the spread out radial projections 95 in an outward direction and finally pressed into the foil.

This embodiment of the invention makes possible an easier introduction of the wire 103 between the individual guide rings 94. The spreading rings 100 are thus pressed on the opposite side out of the position of engagement with the radial projections to the same degree that they are pressed in between the radial projections 95, so that the spreading rings only engage slightly here. In consequence the elastic projections 95b are bent back at this position as far as is allowed by the spreading ring 100 in this drawn back position. Consequently the projections 95b are brought out of engagement with the projections of the adjacent guide ring so that a sufficiently broad gap is produced between the projections 95b of two adjacent rings for the wire 103 to be introduced between them.

Within the shaft 97 an electric heating rod 104 can conveniently be mounted to heat the apparatus and more particularly the pressing fingers 96 to such an extent that when they made contact with the foil 101 the foil is sufficiently plasticised in order to make possible fixation of the wire.

While in the case of the embodiments so far described the wire is introduced firstly into the space between the guide rings and then is pressed outwards over the deforming wedges, embodiments of the invention will be described with reference to FIGS. 18 to 27, which depart from this arrangement in that the wire is always guided on the periphery of the wire applying roller. The basic point in common between these embodiments is that the guide rings are arranged at an angle in relation to each other so that the teeth shaping the wire, which are again arranged on the periphery of the guide rings and directed towards each other, move from the position in which the wire is introduced to a position in which the wire has achieved its final shape.

Figure 19:
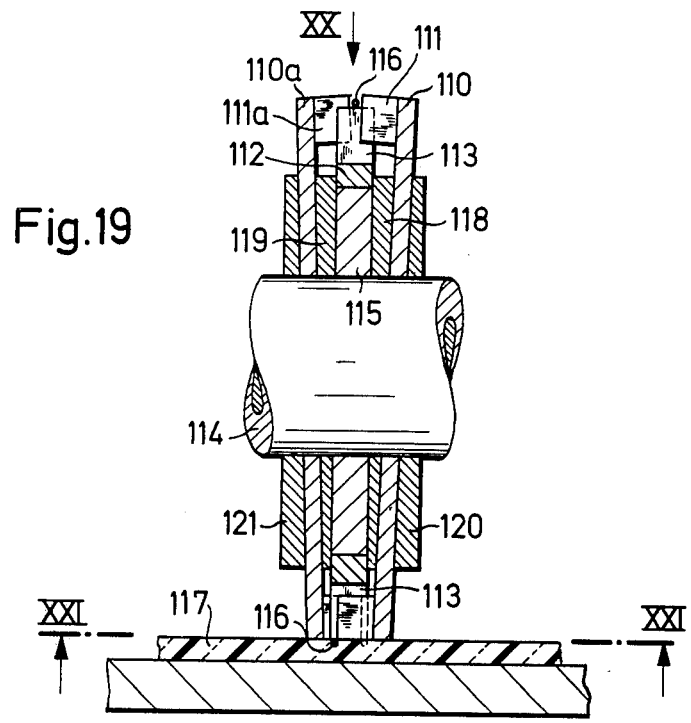
Figure 20:
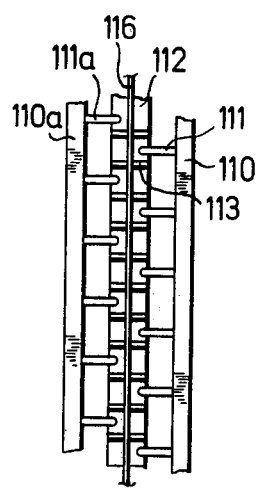
Figure 21:
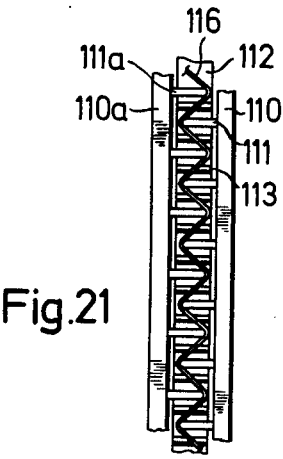
Figure 22:
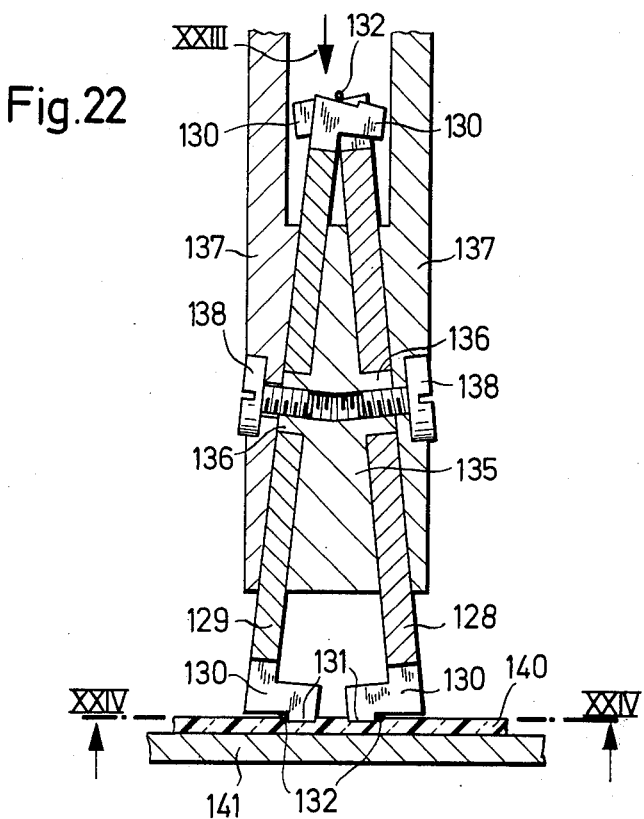
Figure 23:
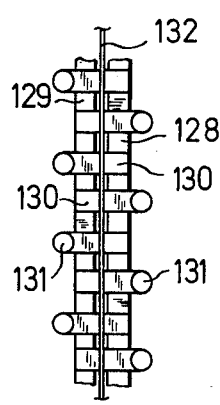

A first apparatus of this type is shown in FIGS. 18 to 21 in various views and in section. An applying or depositing device comprises two obliquely set guide rings 110, 110a. Along their peripheries these guide rings 110, 110a are provided with teeth 111, 111a directed towards each other. The circumferential spacing between the individual teeth 111, 111a is again so large that radially projecting pressing teeth or fingers 113 arranged on a pressing ring 112 fit between the teeth 111, 111a. The guide rings 110, 110a are journalled on the shaft 114. Between the two guide rings 110, 110a the pressing ring 112 is journalled on the disc or washer 115, which is fixed on the shaft 114 so as to be slightly eccentric. Owing to this eccentric positioning of the pressing ring 112, whose diameter is somewhat smaller than the diameter of the guide rings 110, it is ensured that the pressing fingers 113 lie at a position at which the wire 116 is pressed into the foil 117, at the same level as the peripheral surface of the teeth 111, 111a. In the opposite zone the pressing fingers 113 do not extend as far as the outer periphery of the teeth 111, 111a. As a result a gap is formed between the teeth 111, 111a and the pressing fingers 113, and the wire 116 runs into this gap. The wire 116 is thus caused to assume the desired undulating shape continuously on its path through the teeth 111, 111a, and on the other hand, is pressed out again by means of the pressing ring 112 with its pressing fingers 113 from the zone between the teeth 111, 111a. FIG. 20 shows a view from above of the apparatus looking in the direction of the arrow XX of FIG. 19, and FIG. 21 shows a view from below of the apparatus looking in the direction of the arrow XXI. These views indicate once again how the wire 116 is deformed so as to pass from its straight form into the desired undulating form.

The oblique journalling or arrangement of the guide rings 110, 110a on the shaft 114 is brought about by the wedge-shaped spacing rings 118, 119, which are fixed on the shaft 114. The rings 120, 121, which are also in the form of wedges, ensure that the guide rings 110, 110a are held suitably on their other side.

In this apparatus a heating rod 122 is also provided, conveniently within the shaft 114. As a base for the foil 117 use is again made of a rigid plate 123. The wire 116 is unwound from a supply bobbin 124, which is arranged to the side above the applying device.

Preferably, the apparatus is laid against the foil at a position somewhat departing from the position in which the teeth 111, 111a have their minimum spacing, the points of application lying somewhat behind this position of minimum spacing. This ensures that the wire is fully slackened off at the point of application. The pressing ring 112 is in this case preferably arranged so as to be slightly eccentrically displaced in a direction in which the foil moves in relation to the applying device. As a result the application of the wire to the foil is further improved in the slackening range of the wire.

Figure 24:
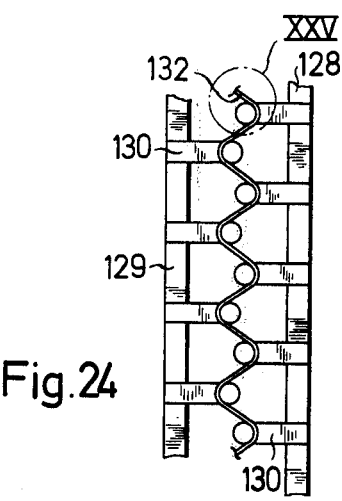

FIGS. 22 to 27 show two further wire applying apparatuses with obliquely set guiding wheels, which operate in accordance with a principle which again is slightly different. While in the case of the embodiment described above the wire is pressed by interengaging teeth into the wave shape, in the case of the forms of apparatus in accordance with FIGS. 22 to 27 to wire is drawn into the undulating shape. The apparatus comprises two guide wheels 128, 129, on whose peripheries teeth 130 are arranged which extend towards each other. At the end of the inwardly directed teeth 130 small radial projections 131 are arranged, which fit behind the wire 132. The radial projections 131 are rounded on the side at which they lie against the wire 132. As appears from FIGS. 25 and 26, the projections can be chamfered on the side opposite to the wire (chamfered surface 133). The guide wheels 128, 129 are journalled on a wedge-shaped circular disc or washer 135 on the stub shafts 136 so as to be inclined towards each other. The wedge-shaped disc or washer 135 with the guide wheels 128, 129 is fixed on the two holding arms 137 with the help of screws 138. The inclination of the two guide wheels 128, 129 towards each other is such that the teeth 130 overlap each other at the top to such an extent that the radial projections 131 lie respectively on the opposite side of the wire 132. This condition is shown particularly clearly in FIGS. 23, which represents a view in the direction of the arrow XXIII. On the side lying against the foil 140, on the other hand, the teeth 130 are so far removed from each other that the wire 132 has the desired undulating shape at this position. FIG. 24 shows this condition. It represents a view from below looking in the direction of the arrows XXIV. The whole apparatus is then run with such a pressure on the base 141 carrying the foil 140 that the radial projections 131 project slightly into the foil surface and the wire is pressed by the peripheral surfaces of the teeth 130 into the foil. The holding arms 137 are heated by means of heating devices, not illustrated, to the temperature necessary for justifying the foil.

FIG. 27 shows a modified form of this apparatus. The difference between it and the apparatus shown in FIGS. 22 to 26 resides in that between the two obliquely set guide wheels 128a, 129a, in the lower part of the wedge-shaped disc or washer 135a a pressing wheel 144 is additionally provided. This wheel is journalled on the shaft 145. It has a circular periphery and its diameter is such that it terminates at the same level as the peripheral surfaces of the radial projections 131a. In the case of this arrangement the radial projections 131a do not need to be pressed into the foil surface. The wire is instead pressed into the foil in the central part of the undulating line by means of the pressing wheel 144 running on the foil surface.

As is the case with the previously described forms of apparatus in the case of this apparatus as well a heating device is provided for heating the applying apparatus to the required temperature.

Figure 28:
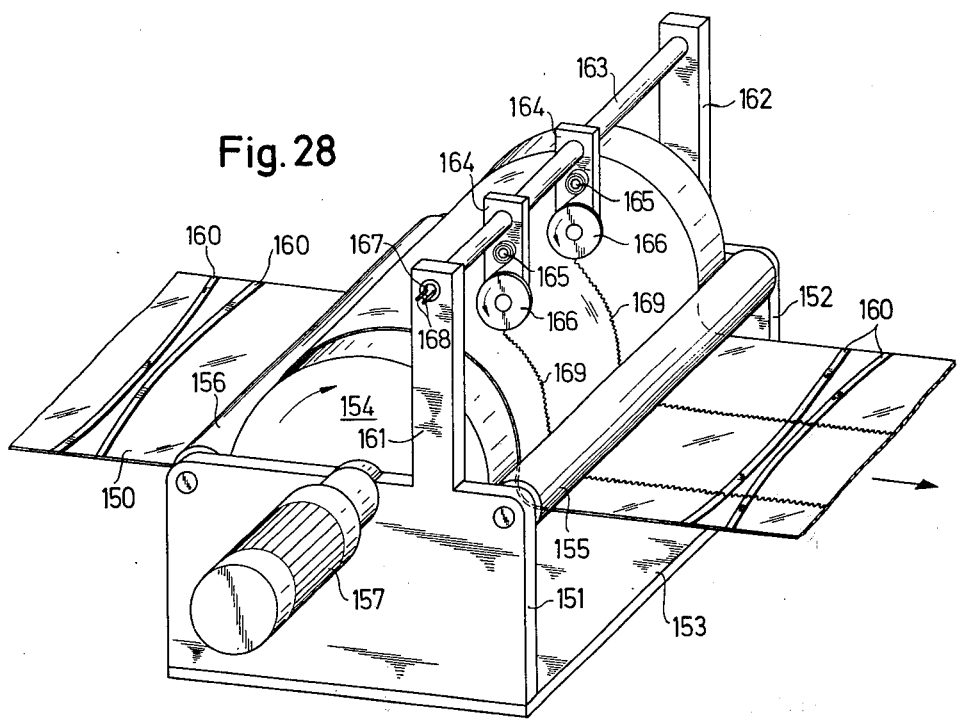
FIG. 28 is a general view of a machine for the simultaneous application of several wires in perspective.

FIG. 28 shows a complete machine for applying a number of wires in an undulating shape to a thermoplastic foil 150. The machine comprises a frame consisting of the side parts 151, 152 and the bottom part 153. The frame carries a support roller 154 as an abutment or base for the foil and two idler rollers 155, 156. The idler rollers 155, 156 serve to hold the foil 150 taut on the support roller 154. For movement of the foil 154 the support roller 154 is driven by means of a motor 157, which is arranged on the side part 151 of the machine frame.

Before the introduction of the foil 15 into the machine rails 160 consisting of thin metal foils or metal flex are applied to the foil to serve as current supply means for the undulating wires applied to the foil. The undulating wires are passed over these current supply rails 160 and later connected with them in a conducting manner, for example by soldering.

The side parts 151, 152 have upwardly directed holding arms 161, 162. Between the latter a support shaft 163 is arranged. On the latter a series of holding pieces 164 is arranged, on which there is arranged on the one hand a supply bobbin 165 for the wire, and on the other hand a wire deforming device 166. The wire deforming means 166 are shown diagrammatically in order to make the drawing easier to understand. They can in fact be constructed in accordance with the forms of apparatus shown in FIGS. 1 to 4 to FIGS. 12 to 27. In the support shaft 163 and electrical heating part 167 is arranged whose current connection leads 168 are shown diagrammatically. The wire deforming and applying means 166 are heated in the embodiment shown in this case via the support shaft 163 and the holding pieces 164. The wire deposited in an undulating form is denoted by reference numeral 169.

In order to facilitate understanding only two wire applying or depositing apparatuses are shown. It is naturally possible to arrange as many wire applying apparatuses on the carrier shaft 163 as can in fact be arranged on it. If a still smaller spacing between the individual wires should be desired, it is possible for a second and if necessary third support shaft to be provided on which, laterally offset in relation to the wire applying apparatus on the or the other carrier shaft(s), further wire applying apparatuses can be arranged.

The embodiments of the invention in which an exclusive property or privilege is claimed are defined as follows:

1. Apparatus for applying wires to a plastic sheet, said apparatus comprising two annular guide members, means to support said members with their axes inclined to each other, and an intermediate annular member of diameter smaller than said guide members disposed between said guide members eccentrically and substantially tangentially with respect to said guide members.

2. Apparatus according to claim 1, wherein said guide members possess mutually interengaging axial extensions and in which said intermediate member includes radially extending teeth engaging between circumferentially adjacent ones of said axial extensions.

3. Apparatus according to claim 2, wherein said axial extensions possess radially and axially sloping surfaces on radially inner portions thereof.

4. Apparatus according to claim 3, including means to introduce a wire between said guide members.

5. Apparatus according to claim 4, wherein said introducing means shift a wire axially of said guide members at a cyclic rate.

6. Apparatus according to claim 4, wherein said introducing means guide a wire axially of said guide members substantially along the axis thereof.

7. Apparatus according to claim 1, including means to spread said guide members at a portion of their periphery circumferentially displaced from that at which they are substantially tangent to said intermediate member.

8. Apparatus for applying a wire in an undulating pattern to a plastic sheet, said apparatus comprising two rings supported on non-parallel axes, said rings having axially extending teeth mutually interengaging over at least a portion of the periphery of said rings, said teeth including each a surface extending substantially radially of its ring and from which a wire may excape without motion axially of said ring, and means to support a sheet in a plane substantially tangential to the radially outer limit of said teeth at one portion of the periphery thereof.

9. Apparatus for applying a wire in an undulating pattern to a plastic sheet, said apparatus comprising two guide rings supported for rotation at a fixed spacing from each other about axes which are oblique to each other, said rings having axially extending teeth on the periphery thereof which interengage at one portion of the periphery of said rings without interengaging at the diametrically opposed portions of said peripheries, and a third ring of smaller outer diameter than either of said guide rings, said third ring having radially extending teeth on the periphery thereof, said third ring being journalled for rotation between said guide rings with its periphery substantially tangent to the periphery of said guide rings in the region of interengagement of the teeth of the latter and with the teeth of said third ring interengaging with the teeth of said guide rings in said region.

10. Apparatus according to claim 8 including a shaft and a plurality of wedge-shaped spacing rings affixed to said shaft for support of said guide rings.

11. Apparatus according to claim 10 including a ring eccentrically fixed on said shaft between said wedge-shaped spacing rings for support of said third ring.

* * * * *

UNITED STATES PATENT AND TRADEMARK OFFICE
CERTIFICATE OF CORRECTION

PATENT NO. : 3,954,547
DATED : May 4, 1976
INVENTOR(S) : WERNER GENTHNER

It is certified that error appears in the above-identified patent and that said Letters Patent are hereby corrected as shown below:

Column 8, line 55, for "arrow" read -- arrows -- .

Column 9, line 19, for "to wire" read -- the wire -- ;

Column 10, line 12, for "foil 154" read -- foil 150 -- ;
          line 16, for "foil 15" read -- foil 150 -- ;
          line 32, for "1 to 4 to" read -- 1 to 4 or -- ;

Column 11, line 22, for "excape" read -- escape -- .

Column 12, line 18, for "claim 8" read -- claim 9 -- .

Signed and Sealed this

Fifth Day of October 1976

[SEAL]

Attest:

RUTH C. MASON
*Attesting Officer*

C. MARSHALL DANN
*Commissioner of Patents and Trademarks*